US012699161B2

(12) United States Patent
Wu et al.

(10) Patent No.: US 12,699,161 B2
(45) Date of Patent: Aug. 4, 2026

(54) ELECTRONIC DEVICE INCLUDING GROUPS OF TRANSMITTING COMPONENTS ALIGNED IN DIFFERENT DIRECTIONS

(71) Applicant: Advanced Semiconductor Engineering, Inc., Kaohsiung (TW)

(72) Inventors: Cheng-Yu Wu, Kaohsiung (TW); Hung-Hsiang Cheng, Kaohsiung (TW)

(73) Assignee: Advanced Semiconductor Engineering, Inc., Kaohsiung (TW)

( * ) Notice: Subject to any disclaimer, the term of this patent is extended or adjusted under 35 U.S.C. 154(b) by 271 days.

(21) Appl. No.: 18/401,304

(22) Filed: Dec. 29, 2023

(65) Prior Publication Data

US 2025/0219283 A1       Jul. 3, 2025

(51) Int. Cl.
*G01S 7/02*        (2006.01)
*H01Q 1/32*        (2006.01)
*H01Q 1/52*        (2006.01)

(52) U.S. Cl.
CPC ............. *G01S 7/02* (2013.01); *H01Q 1/3233* (2013.01); *H01Q 1/525* (2013.01)

(58) Field of Classification Search
CPC ......... G01S 7/02; H01Q 1/3233; H01Q 1/525

USPC ........................................................ 342/368
See application file for complete search history.

(56) References Cited

U.S. PATENT DOCUMENTS

| | | | | |
|---|---|---|---|---|
| 10,823,819 | B2 * | 11/2020 | Loesch | .................. G01S 13/42 |
| 11,822,002 | B2 * | 11/2023 | Kishigami | .............. G01S 13/42 |
| 2008/0106467 | A1 * | 5/2008 | Navarro | ................... H01Q 3/26 |
| | | | | 342/372 |
| 2011/0163919 | A1 | 7/2011 | Suzuki | |
| 2013/0027269 | A1 * | 1/2013 | Orime | ................... H01Q 21/06 |
| | | | | 343/841 |
| 2015/0346322 | A1 | 12/2015 | Schmalenberg et al. | |
| 2016/0282450 | A1 * | 9/2016 | Kishigami | ............ G01S 13/426 |
| 2018/0048048 | A1 * | 2/2018 | Socher | ................ H01Q 1/2283 |
| 2018/0151961 | A1 * | 5/2018 | Lim | .................... H01Q 21/065 |
| 2020/0303806 | A1 | 9/2020 | Wu et al. | |
| 2021/0234261 | A1 * | 7/2021 | Convent | ................. H01Q 3/24 |

* cited by examiner

*Primary Examiner* — Brady W Frazier
(74) *Attorney, Agent, or Firm* — Foley and Lardner LLP

(57) ABSTRACT

The present disclosure provides an electronic device. The electronic device includes a circuit structure, a plurality of receiving components, and a plurality of transmitting components. The receiving components are disposed over the circuit structure and arranged along a first direction. The transmitting components are supported by the circuit structure. A portion of the transmitting components is misaligned along the first direction.

5 Claims, 10 Drawing Sheets

21

204

20d3
20d2
203
202
20d1
201

Z
Y
X

ELECTRONIC DEVICE INCLUDING GROUPS OF TRANSMITTING COMPONENTS ALIGNED IN DIFFERENT DIRECTIONS

BACKGROUND

1. Field of the Disclosure

The present disclosure generally relates to an electronic device, in particular to an electronic device including an adjustable waveguide.

2. Description of the Related Art

To reduce size and improve integration of electronic device packages, several packaging solutions, such as antenna in package (AiP) and antenna on package (AoP) have been developed and implemented.

However, to support industry demand for increased electronic functionality, the size and/or form factor of electronic device packages is increased commensurately, clearly limiting functionality of some applications (e.g., device portability).

SUMMARY

In some embodiments, an electronic device includes a circuit structure, a plurality of receiving components, and a plurality of transmitting components. The receiving components are disposed over the circuit structure and arranged along a first direction. The transmitting components are disposed over the circuit structure. A portion of the transmitting components is misaligned along the first direction.

In some embodiments, an electronic device includes a circuit structure, a plurality of receiving components, and a plurality of transmitting components. The plurality of transmitting components are supported by the circuit structure and include a first group and a second group configured to operate at different modes. The plurality of receiving components are disposed over the circuit structure and configured to receive an electromagnetic wave at least partially radiated from the transmitting components.

In some embodiments, an electronic device includes a plurality of receiving components and a plurality of transmitting components. The plurality of transmitting components are arranged along a first direction and define a first imaginary line passing through geometry centers of at least two of the plurality of transmitting components. The plurality of receiving components are arranged along the first direction and define a second imaginary line passing through geometry centers of each of the plurality of receiving components. The first imaginary line is nonparallel to the second imaginary line.

BRIEF DESCRIPTION OF THE DRAWINGS

Aspects of some embodiments of the present disclosure are best understood from the following detailed description when read with the accompanying figures. It is noted that various structures may not be drawn to scale, and dimensions of the various structures may be arbitrarily increased or reduced for clarity of discussion.

DETAILED DESCRIPTION

Figure 1A:
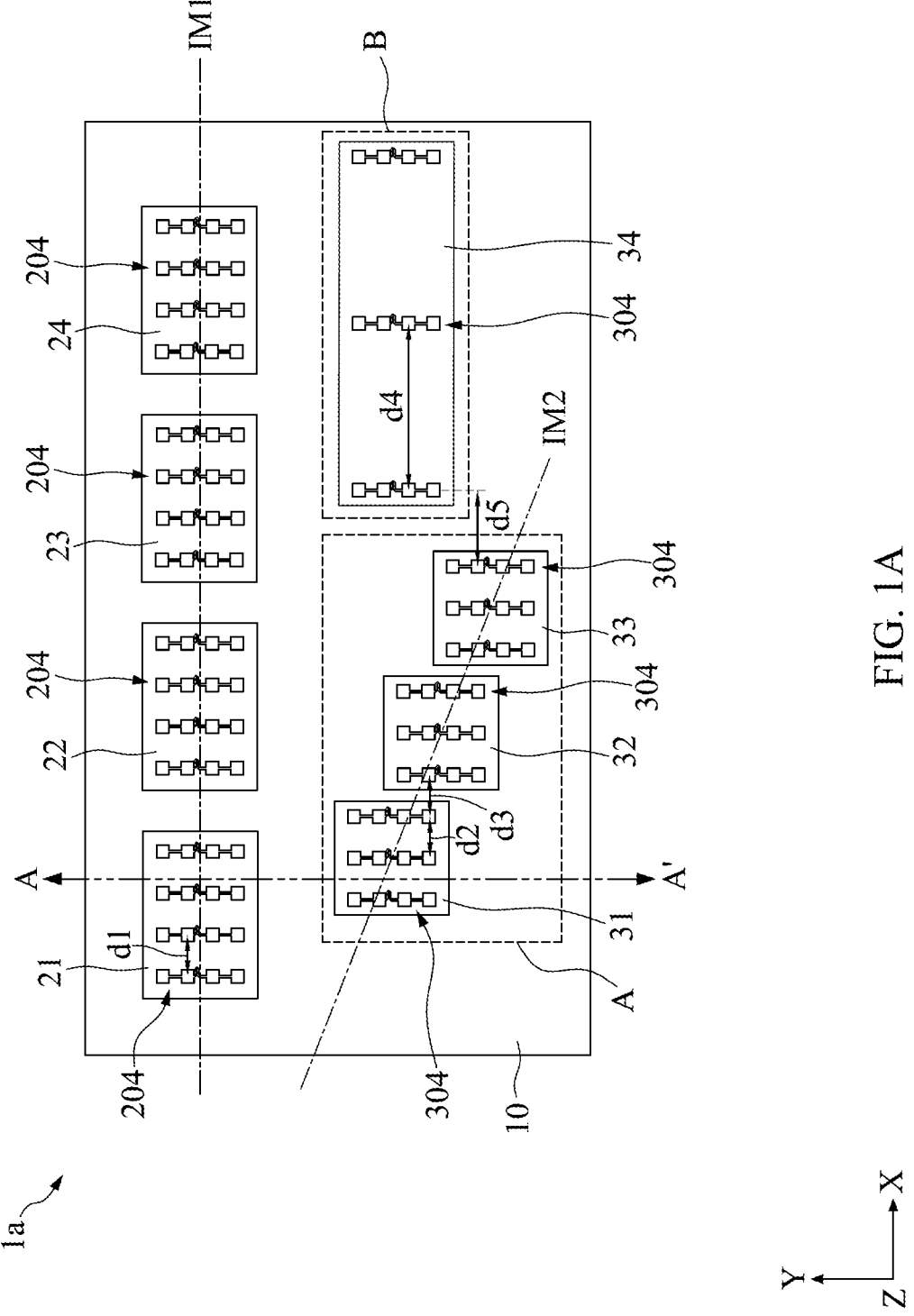
FIG. 1A is a top view of an electronic device, in accordance with an embodiment of the present disclosure.

Common reference numerals are used throughout the drawings and the detailed description to indicate the same or similar components. Embodiments of the present disclosure will be readily understood from the following detailed description taken in conjunction with the accompanying drawings.

The following disclosure provides many different embodiments, or examples, for implementing different features of the provided subject matter. Specific examples of components and arrangements are described below to explain certain aspects of the present disclosure. These are, of course, merely examples and are not intended to be limiting. For example, the formation of a first feature over or on a second feature in the description that follows may include embodiments in which the first and second features are formed or disposed in direct contact, and may also include embodiments in which additional features may be formed or disposed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

FIG. 1A is a top view of an electronic device 1a, in accordance with an embodiment of the present disclosure. In some embodiments, the electronic device 1a may be applicable to, for example, a wireless device, such as user equipment (UE), a mobile station, a mobile device, an apparatus communicating with the Internet of Things (IoT), etc. In some embodiments, the electronic device 1a may be or include a portable device. In some embodiments, the electronic device 1a may support fifth generation (5G) communications, such as Sub-6 GHz frequency bands and/or millimeter (mm) wave frequency bands. For example, the electronic device 1a may incorporate both Sub-6 GHz devices and millimeter-wave devices. In some embodiments, the electronic device 1a may support beyond-5G or 6G communications, such as terahertz (THz) frequency. The electronic device 1a may be configured to radiate and/or receive electromagnetic signals, such as radio frequency (RF) signals. For example, the electronic device 1a may be configured to operate in a frequency between about 10 GHz and about 10 THz, such as 10 GHz, 20 GHz, 30 GHz, 40 GHz, 50 GHz, 100 GHz, 300 GHz, 1 THz, 5 THz, or 10 THz. The electronic device 1*a* may include a circuit structure 10, receiving components 21, 22, 23, and 24, as well as transmitting components 31, 32, 33, and 34. In some embodiments, the electronic device 1*a* may be applicable to an automotive radar to monitor a distance of an external object(s) within the environment.

The receiving components 21, 22, 23, and 24 may be disposed on or over the circuit structure 10. Each of the receiving components 21 to 24 may include an antenna in package (AiP) structure. In some embodiments, each of the receiving components 21 to 24 may be configured to receive a reflected signal(s) from an external object (not shown) of the environment. Each of the receiving components 21 to 24 may include antenna arrays 204 exposed by the upper surface.

The transmitting components 31, 32, 33, and 34 may be disposed on or over the circuit structure 10. Each of the transmitting components 31 to 34 may include an AiP structure. In some embodiments, each of the transmitting components 31 to 34 may be configured to generate a signal(s) and transmit said signal(s) toward an external object. Each of the transmitting components 31 to 34 may include antenna arrays 304 exposed by the upper surface. The receiving components 21 to 24 and transmitting components 31 to 34 may be applicable to a millimeter-wave radar that transmits and receives radio waves of millimeter-wave bands, which thereby detects a distance to an external object.

Figure 1B:
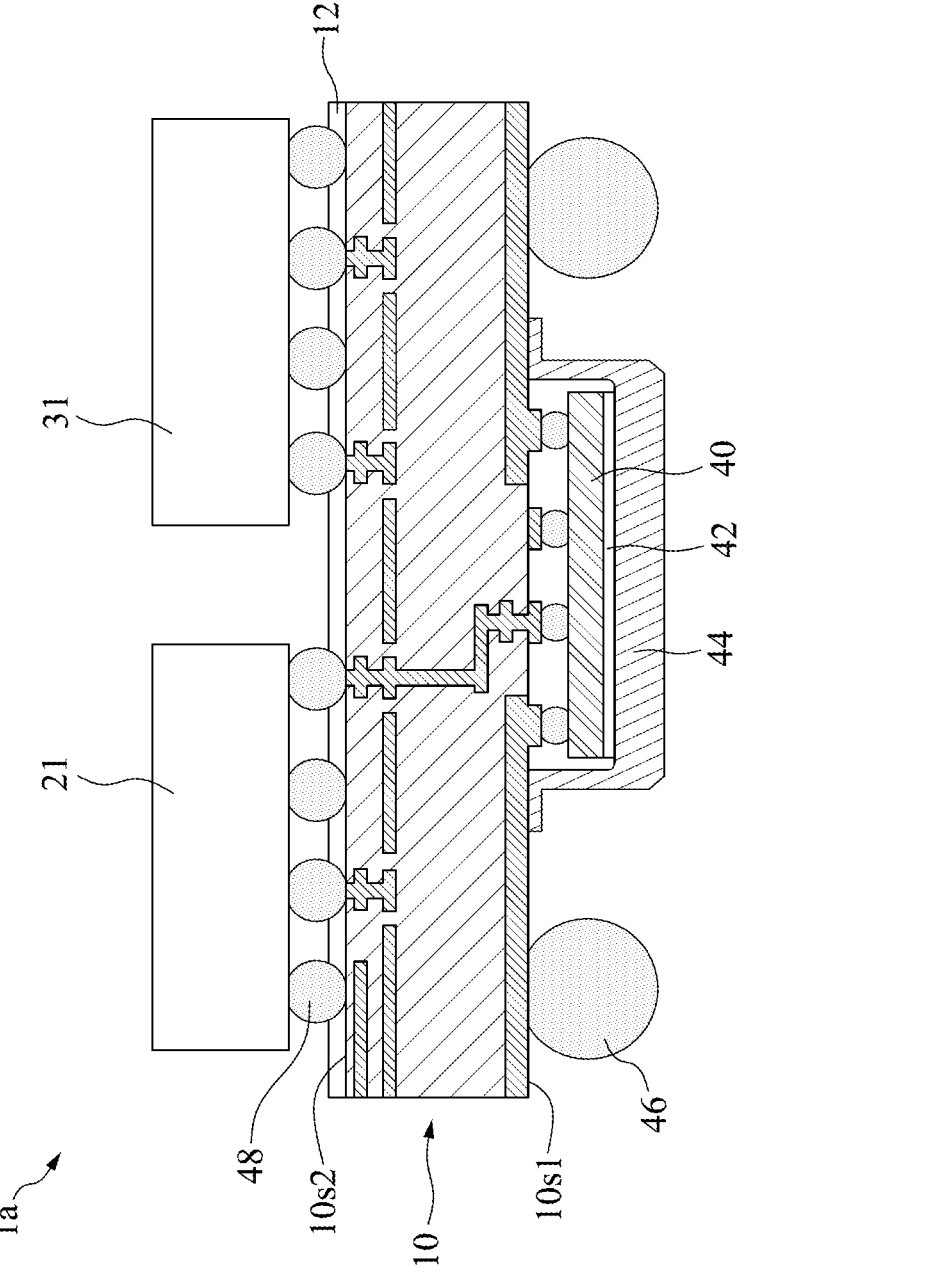
FIG. 1B is a cross-sectional view along line A-A' of the electronic device as shown in FIG. 1A, in accordance with an embodiment of the present disclosure.

Please refer to FIG. 1B, which is a cross-sectional view along line A-A' of the electronic device as shown in FIG. 1A. In some embodiments, the circuit structure 10 may include a plurality of dielectric layers with different dimensions (e.g., profiles, areas, lengths, widths, apertures and/or diameters) and a plurality of conductive elements with different dimensions. The circuit structure 10 may be or include, for example, a substrate. In some embodiments, the circuit structure 10 may include, for example, a printed circuit board (PCB), such as a paper-based copper foil laminate, a composite copper foil laminate, or a polymer-impregnated glass-fiber-based copper foil laminate. The circuit structure 10 may include a surface 10*s*1 (or a lower surface) and a surface 10*s*2 (or an upper surface) opposite to the surface 10*s*1. The circuit structure 10 may include patterned solder resist layers on the surfaces 10*s*1 and/or 10*s*2. For example, a solder resist layer 12 may be disposed on the surface 10*s*2 of the circuit structure 10. Each of the receiving components 21 to 24 may be disposed on or over the surface 10*s*2 of the circuit structure 10. Each of the transmitting components 31 to 34 may be disposed on or over the surface 10*s*2 of the circuit structure 10.

In some embodiments, the electronic device 1*a* may include an electronic component 40, a heat dissipating element 42, an electromagnetic interference (EMI) shielding structure 44, and electrical connectors 46 and 48. In some embodiments, the electronic component 40 may be disposed on or below the surface 10*s*1 of the circuit structure 10. The electronic component 40 may be electrically connected to the circuit structure 10 (e.g., to the interconnection(s)) through electrical connectors (not annotated) attained by way of flip-chip, wire-bond techniques, metal to metal bonding (such as Cu to Cu bonding), or hybrid bonding. The electronic component 40 may be a chip or a die including a semiconductor substrate, one or more integrated circuit (IC) devices, and one or more overlaying interconnection structures therein. The IC devices may include active devices such as transistors and/or passive devices such as resistors, capacitors, inductors, or a combination thereof. For example, the electronic component 40 may include a system on chip (SoC). For example, the electronic component 40 may include a radio frequency integrated circuit (RFIC), an application-specific IC (ASIC), a central processing unit (CPU), a microprocessor unit (MPU), a graphics processing unit (GPU), a microcontroller unit (MCU), a field-programmable gate array (FPGA), or another type of IC. In some embodiments, the electronic component 40 may be configured to provide the receiving components 21 to 24 and/or transmitting components 31 to 34 with a signal (e.g., a feed signal or an RF signal) through the circuit structure 10.

The heat dissipating element 42 may be disposed between the electronic component 40 and the EMI shielding structure 44. The heat dissipating element 42 may be configured to dissipate the heat of the electronic component 40. The heat dissipating element 42 may include a thermal interface material (TIM) or other suitable materials.

In some embodiments, the EMI shielding structure 44 may be disposed on or below the surface 10*s*1 of the circuit structure 10. In some embodiments, the EMI shielding structure 44 may cover the lower surface and lateral surface of the electronic component 40. The EMI shielding structure 44 may be electrically connected to the circuit structure 10 (e.g., the grounding layer of the circuit structure 10). The EMI shielding structure 44 may be configured to provide electromagnetic interference (EMI) shielding protection for the electronic component 40. For example, the EMI shielding structure 44 may be configured to provide an EMI shielding to prevent the electronic component 40 from being interfered with by other electronic components, and vice versa. In some embodiments, the EMI shielding structure 44 may include copper (Cu) or other conductive materials, such as aluminum (Al), chromium (Cr), tin (Sn), gold (Au), silver (Ag), nickel (Ni) or stainless steel, another metal, or a mixture, an alloy, or other combinations of two or more thereof.

The electrical connectors 46 may be disposed on or below the surface 10*s*1 of the circuit structure 10. In some embodiments, the electrical connectors 46 may be configured to electrically or signally connect to an external device (not shown). In some embodiments, the electrical connectors 46 may include, for example, a solder material, such as alloys of gold and tin solder or alloys of silver and tin solder.

The electrical connectors 48 may be disposed on or below the surface 10*s*2 of the circuit structure 10. In some embodiments, the electrical connectors 48 may electrically connect the receiving component 21 (or 31) and the circuit structure 10. In some embodiments, the electrical connectors 48 may include, for example, a solder material, such as alloys of gold and tin solder or alloys of silver and tin solder.

Figure 1C:
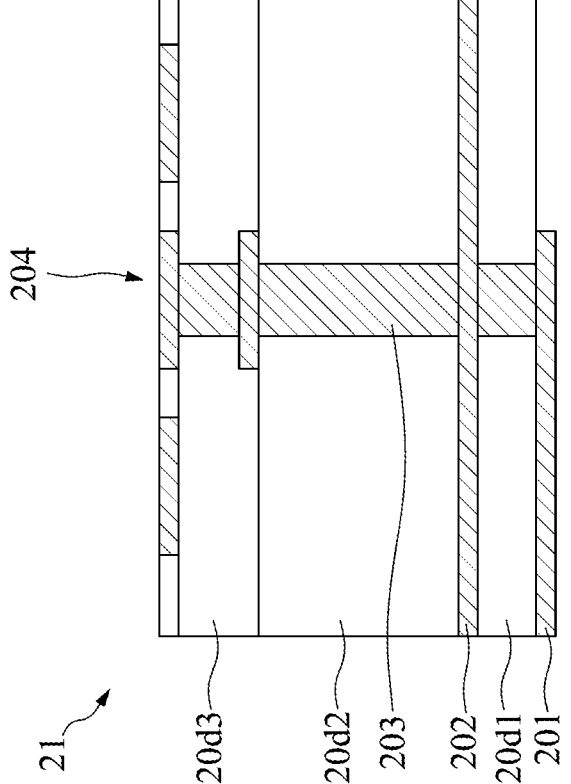
FIG. 1C is a partial enlarged view of a receiving component as shown in FIG. 1B, in accordance with an embodiment of the present disclosure.
Figure 1C:
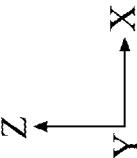

Please refer to FIG. 1C, which is a partial enlarged view of the receiving component 21 (or 22 to 24). The receiving component 21 may include dielectric layers 20*d*1, 20*d*2, and 20*d*3. The receiving component 21 may include a transmission component 201 (or a transmitting circuit), a grounding layer 202, a conductive structure 203, and an antenna array 204. It should be noted that FIG. 1C is a side perspective view, and features that overlap along the Y direction may have a distance therebetween along the Y direction. For example, the conductive structures 203 and the grounding layer 202 have a distance along the Y direction.

In some embodiments, each of the dielectric layers 20*d*1, 20*d*2, and 20*d*3 may have a relatively small dielectric constant (dk) in comparison with a dielectric material of the circuit structure 10 to facilitate signal transmission and/or communication. The dielectric layer 20d1 may serve as the bottommost layer of the circuit structure 10. The dielectric layer 20d2 may be disposed on or over the dielectric layer 20d1. The dielectric layer 20d3 may be disposed on or over the dielectric layer 20d2. In some embodiments, the material of the dielectric layers 20d1, 20d2, and 20d3 may include, for example, bismaleimide triazine (BT), ajinomoto build-up film (ABF), or other suitable materials. The dielectric layers 20d1, 20d2, and 20d3 may have the same or different thicknesses.

The transmission component 201 may be disposed on or below the lower surface of the receiving component 21. The transmission component 201 may be configured to receive a signal from the electronic component 40. The transmission component 201 may be configured to transmit a signal, such as a feed signal.

The grounding layer 202 may be disposed on or over the dielectric layer 20d1 and within the dielectric layer 20d2. The grounding layer 202 may be electrically connected to real ground or virtual ground.

The conductive structure 203 (or a conductive via) may penetrate the dielectric layers 20d1, 20d2, and 20d3. The conductive structure 203 may be electrically connected to the transmission component 201. The conductive structure 203 may be electrically connected to the antenna array 204.

The antenna array 204 may be disposed on or over the dielectric layer 20d3. In some embodiments, the antenna array 204 may include a series feed path array (SFPA). In some embodiments, the antenna array 204 may be configured to receive a signal(s) (e.g., RF signal) from an external object of the environment. The antenna array 204 may include multiple conductive patches (not annotated) with a square profile or a rectangular profile. Each of the conductive patches may function as an antenna. In this embodiment, a feed signal may be transmitted to the antenna array 204 by a middle-feed technique where said feed signal is transmitted to the antenna array 204 from a central region (e.g., a region corresponding the inner conductive patch) of the antenna array 204, rather than from an edge region (e.g., a region corresponding the outer conductive patch) of the antenna array 204. Therefore, the impedance may be improved. The feed signal (or current) may be distributed more symmetrically. As a result, the performance (e.g., bandwidth and/or gain) of the receiving component 21 may be enhanced.

The receiving component 21 may have more traces based on requirements. Although not shown, it should be noted that each of the transmitting components 31 to 34 may have a structure the same as or similar to that of the receiving component 21. For example, each of the transmitting components 31 to 34 may include an antenna array 304 configured to emit a signal(s) (e.g., RF signal) toward an external object of the environment. In this embodiment, the transmitters (e.g., antenna array 304) and receivers (e.g., antenna array 204) are disposed within different AiP structures. The layout of arranging transmitters and/or receivers may become more flexible, depending on electrical property requirements of the electronic device 1a. Further, in comparison with a conventional package structure where the antenna and the RF die are integrated within a printed circuit board, the electronic device 1a may have a relatively small size (e.g., thickness and/or surface area) because the circuit structure 10 of the present disclosure may have a relatively large dk.

Figure 1D:
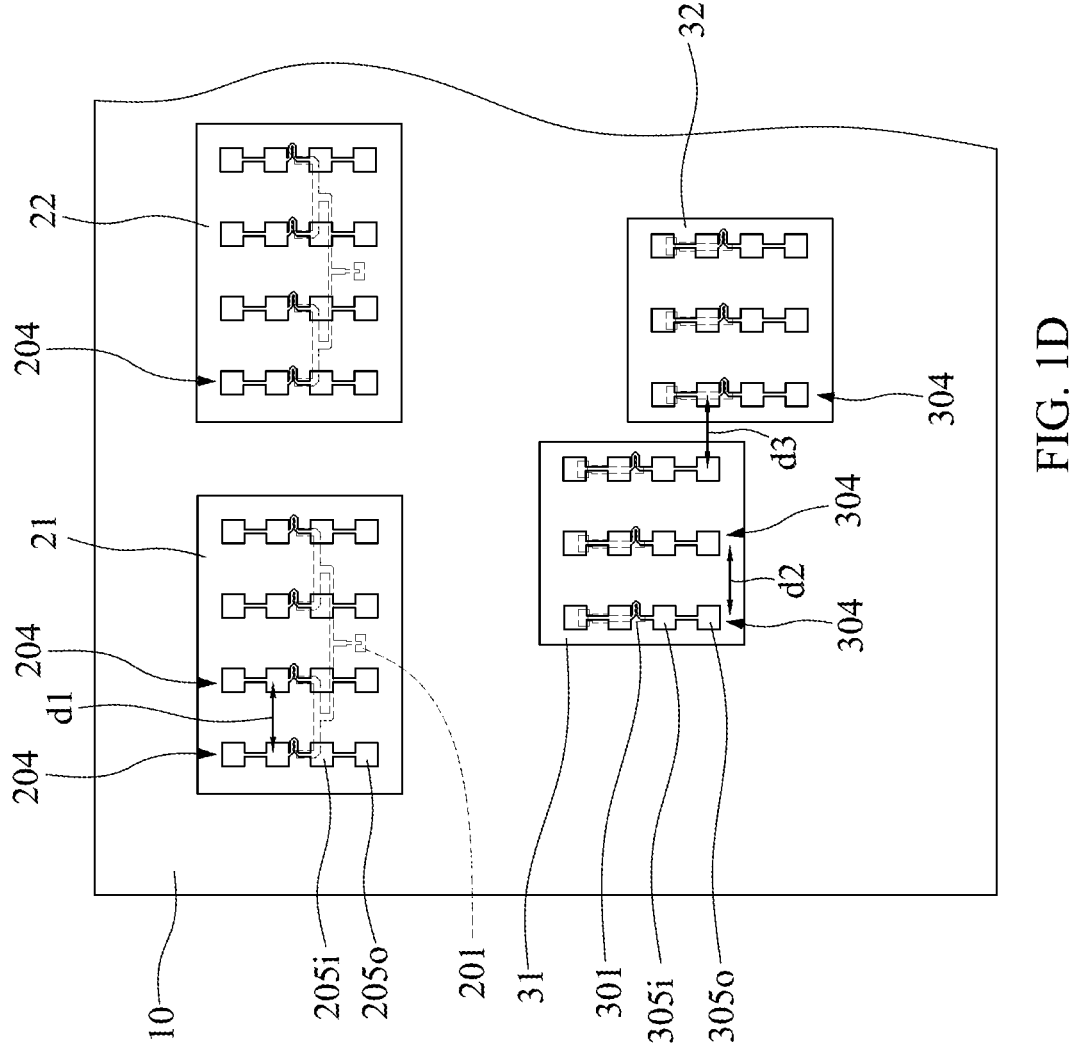
FIG. 1D is a partial enlarged view of the electronic device as shown in FIG. 1A, in accordance with an embodiment of the present disclosure.

Please refer to FIG. 1D, which is a partial enlarged view of FIG. 1A. In some embodiments, abutting antenna arrays

204 of the same AiP may define a distance d1 therebetween. In some embodiments, the distance d1 may be substantially equal to 0.5 λ of a signal received and/or transmitted by the antenna arrays 204. In some embodiments, abutting antenna array 304 of the same AiP (e.g., transmitting component 31) may define a distance d2 therebetween. In some embodiments, the distance d2 may be substantially equal to 0.5 λ of a signal received and/or transmitted by the antenna array 304. In some embodiments, abutting antenna arrays 304 of different AiPs (e.g., transmitting components 31 and 32) may define a distance d3 therebetween. In some embodiments, the distance d3 may be substantially equal to or greater than 0.5 λ and equal to or less than 0.9 λ of a signal received and/or transmitted by the antenna arrays 304. In some embodiments, the quantity of the antenna arrays 204 of the receiving component 21 may be greater than that of the antenna array 304 of the transmitting component 31. In some embodiments, the surface area (e.g., upper surface) of the receiving component 21 may be greater than that of the transmitting component 31. Although FIG. 1D illustrates that the receiving component 21 has the transmission component 201 electrically connected to four antenna arrays 204, the receiving component 21 may have four transmission components 201, each of which is electrically connected to a corresponding antenna array 204. Further, a signal (e.g., feed signal) may be transmitted to the antenna array 204 from the inner conductive patch 205i rather than from the outer conductive patch 205o. The transmitting component 31 may have multiple feed components 301 (or feed circuits) electrically connected to corresponding antenna arrays 304. Further, a signal (e.g., feed signal) may be transmitted to the antenna array 304 from the inner conductive patch 305i rather than from the outer conductive patch 305o by a middle-feed technique. In some embodiments, the antenna array 304 may include SFPA.

In other embodiments, the distance between abutting antenna arrays 204 of the receiving components 21 and 22 may be modified and equal to the distance d1 so that both the receiving components 21 and 22 may collectively function as a group of a receiving module. Similarly, the receiving components 21, 22, 23 and 24 may function as a group of a receiving module.

Referring back to FIG. 1A, the receiving components 21 to 24 may be arranged along the X direction. In some embodiments, the receiving components 21 to 24 may be aligned along the X direction. In some embodiments, some of the transmitting components (e.g., 31 to 33) are misaligned along the X direction. In this disclosure, "A" is misaligned with "B" along the X direction, which indicates that an imaginary line passing through the geometric centers of A and B is not parallel to the X direction. In this disclosure, "A" is aligned with "B" along the X direction, which indicates that an imaginary line passing through the geometric centers of A and B is parallel to the X direction or that an imaginary line can overlap both an edge (or lateral surface) of A and a corresponding edge (or lateral surface) of B. For example, the imaginary line IM1 passes through the geometric centers of the receiving components 21 to 24 and is parallel to the X direction. In some embodiments, the imaginary line IM2 passes through the geometric centers of the transmitting components 31 to 33 and is nonparallel to the X direction. In some embodiments, a distance between the imaginary lines IM1 and IM2 may vary along the X direction. In some embodiments, the imaginary lines IM2 does not pass through the geometry center of the transmitting component 34. In some embodiments, any two of the transmitting components 31 to 33 which abut may at least partially overlap along the X direction, thereby improving the resolution of the signal(s). In some embodiments, the antenna arrays 304 of the two abutting transmitting components (e.g., any two of the transmitting components 31 to 33) may at least partially overlap along the X direction. In some embodiments, the geometric centers of the transmitting components 31 and 32 may have a shift along the Y direction. In some embodiments, the geometric centers of the antenna arrays 304 of the transmitting components 31 and 32 may have a shift along the Y direction.

In some embodiments, the transmitting components 31 to 33 may collectively define or be classified as a group A which operates at a beamforming mode. Each of the transmitting components 31 to 33 may generate signals. The signals, which have phase difference, of the transmitting components 31 to 33 may generate a constructive interference at a far field. The beamforming mode may refer to a signal processing technique to shape or steer an antenna beam (e.g., a transmit beam, a receive beam) along a spatial path between the transmitting component and the receiving component or between the transmitting component and an external object receiving the signals from the transmitting component. Beamforming may be achieved by combining the signals communicated via antenna elements of an antenna array such that some signals propagating at particular orientations with respect to an antenna array experience constructive interference while others experience destructive interference. The signals may be adjusted by the electronic component 40 through applying amplitude offsets, phase offsets, or both.

In some embodiments, the transmitting component 34 may define or be classified as a group B which operates at a multi-input multi-output (MIMO) mode. The transmitting component 34, operating at the MIMO mode, may exploit multipath signal propagation and increase the spectral efficiency by transmitting or receiving multiple signals via different antenna arrays 304 and 204. The multiple signals may be transmitted by the transmitting component (e.g., 34) via different antenna arrays (e.g., 304) or different combinations of antenna arrays. Likewise, the multiple signals may be received by the receiving component (e.g., 21, 22, 23, and/or 24) via different antenna arrays (e.g., 204) or different combinations of antenna arrays. Each of the multiple signals may be referred to as a separate spatial stream and may carry bits associated with the same data stream (e.g., the same codeword) or different data streams (e.g., different codewords). In some embodiments, the antenna arrays 304 of the transmitting component 34 of the group B may define a distance d4 therebetween. In some embodiments, the distance d4 may be substantially equal to 2 λ of a signal received and/or transmitted by the antenna array 304. In this embodiment, each of the transmitting components 31 to 34 operates at either the beamforming mode or at MIMO mode. A distance d5 between the transmitting components 33 and 34 may range between, for example, 0.5 λ, and 2 λ, such as 0.5 λ, 1 λ, 1.5 λ, or 2 λ. For example, the distance d5 may be the same as or different from the distance d2. The distance d5 may be the same as or different from the distance d4. In some embodiments, the quantity of antenna arrays 304 of the group A may be greater than the quantity of antenna arrays 304 of the group B. Therefore, the electronic device 1a may have more antenna arrays configured to operate at beamforming mode, which thereby achieves a greater angle of scan and a greater gain. Further, the quantity of the antenna arrays 204 (or 304) within one receiving component 21 to 24 (or transmitting component 31 to 34) may be modified to meet the required performance, and the receiving components 21 to 24 (or transmitting components 31 to 34) may have different quantities of the antenna arrays 204 (or 304), which thereby reduces the size of the electronic device 1a.

In this embodiment, the transmitting components 31 to 33 may have a shift along the Y direction. As a result, a hybrid signal generating from a combination of the transmitting components 31 to 33 may have a relatively great angle (e.g., elevation angle or transmitting angle of coverage), which facilitates detecting more external objects.

Figure 2A:
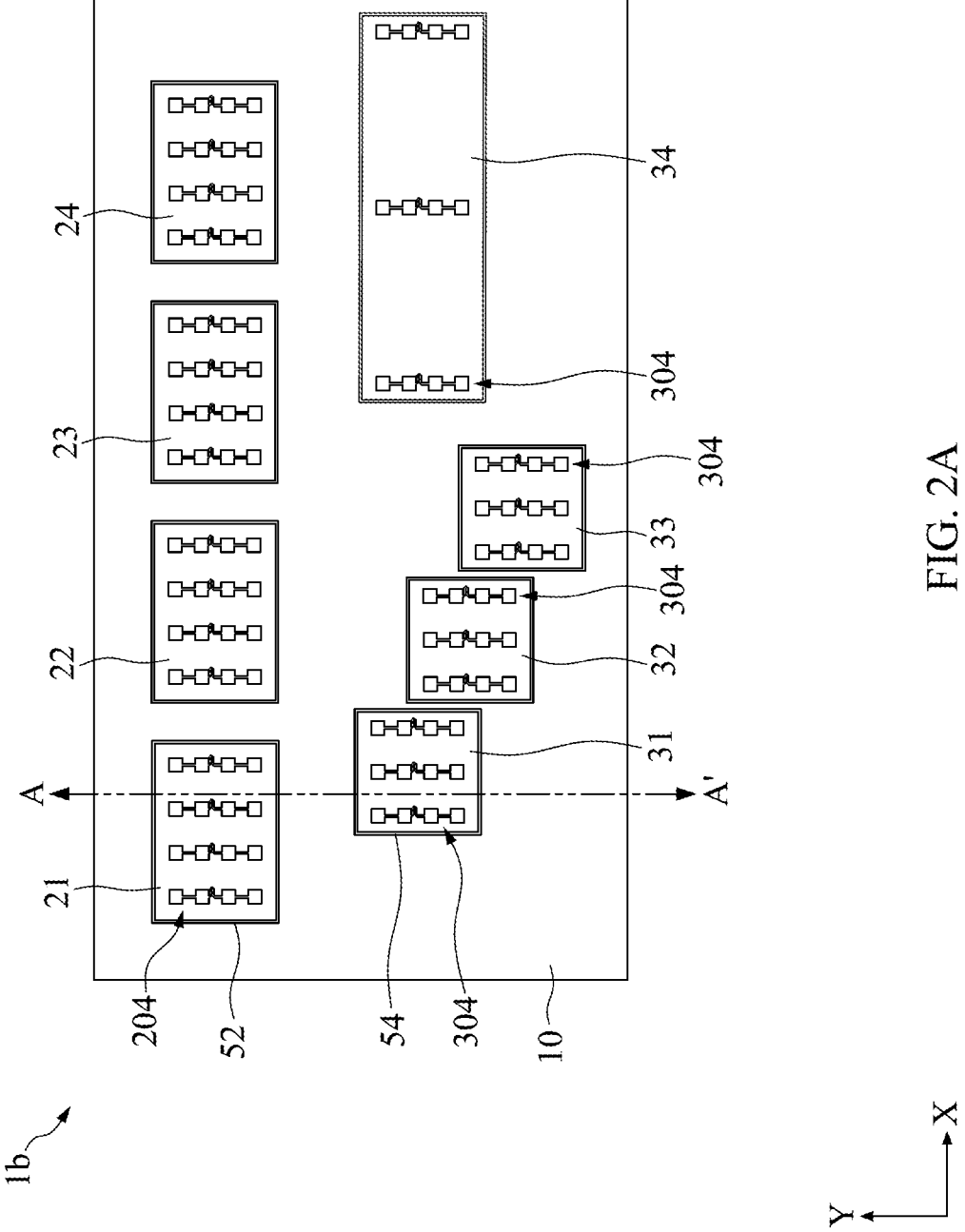
FIG. 2A is a top view of an electronic device, in accordance with an embodiment of the present disclosure.
Figure 2B:
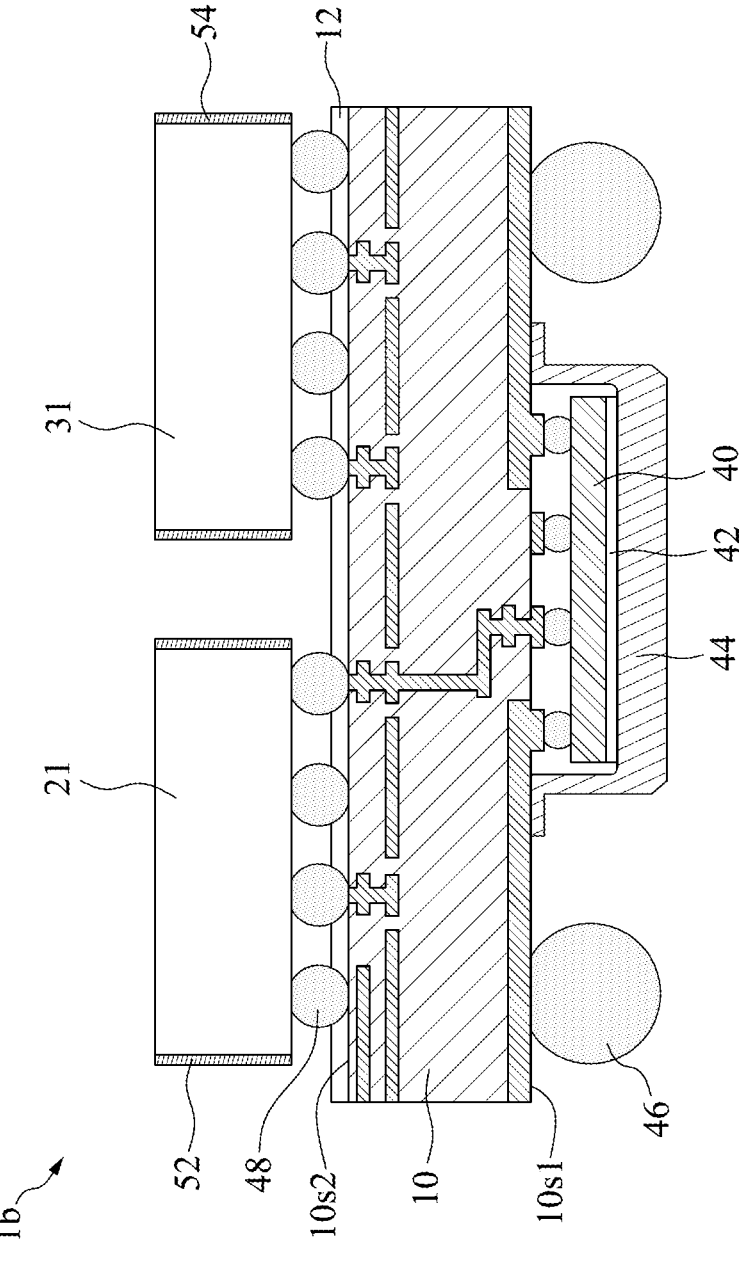
FIG. 2B is a cross-sectional view along line A-A' of the electronic device as shown in FIG. 1A, in accordance with an embodiment of the present disclosure.

FIG. 2A and FIG. 2B illustrate an electronic device 1b, in accordance with an embodiment of the present disclosure, wherein FIG. 2A is a top view, and FIG. 2B is a cross-sectional view.

In some embodiments, the electronic device 1b may include multiple EMI shielding structures 52. In some embodiments, the EMI shielding structure 52 may cover the lateral surface of the receiving component 21 (or 22 to 24). The EMI shielding structure 52 may be configured to provide EMI shielding protection for the receiving component 21 (or 22 to 24). In some embodiments, the EMI shielding structure 52 may include copper (Cu) or other conductive materials, such as aluminum (Al), chromium (Cr), tin (Sn), gold (Au), silver (Ag), nickel (Ni) or stainless steel, another metal, or a mixture, an alloy, or other combinations of two or more thereof.

In some embodiments, the electronic device 1b may include multiple EMI shielding structures 54. In some embodiments, the EMI shielding structure 54 may cover the lateral surface of the transmitting component 31 (or 32 to 34). The EMI shielding structure 54 may be configured to provide EMI shielding protection for the transmitting component 31 (or 32 to 34). In some embodiments, the EMI shielding structure 54 may include copper (Cu) or other conductive materials, such as aluminum (Al), chromium (Cr), tin (Sn), gold (Au), silver (Ag), nickel (Ni) or stainless steel, another metal, or a mixture, an alloy, or other combinations of two or more thereof.

Figure 3:
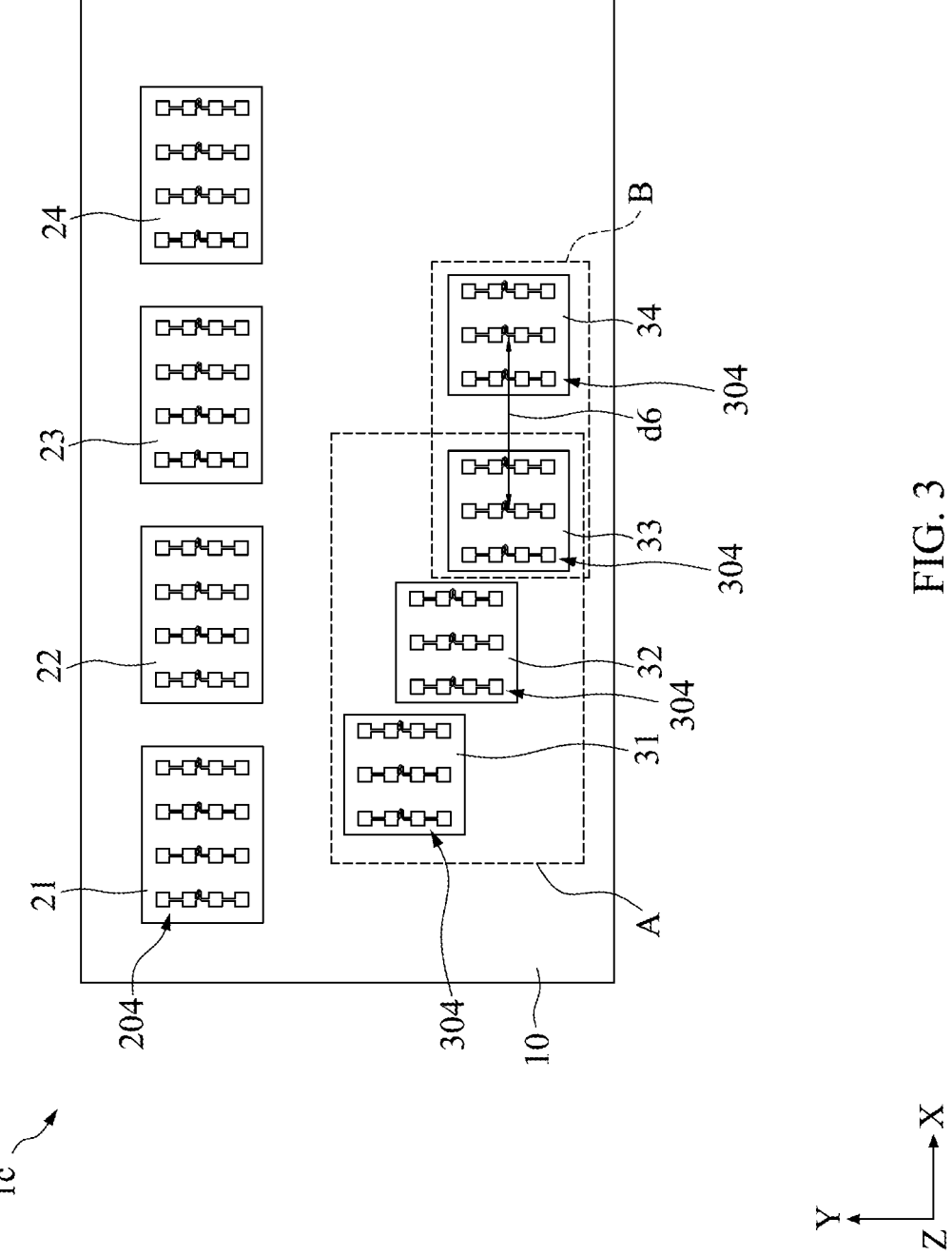
FIG. 3 is a cross-sectional view of an electronic device, in accordance with an embodiment of the present disclosure.

FIG. 3 is a cross-sectional view of an electronic device 1c, in accordance with an embodiment of the present disclosure. The electronic device 1c is similar to the electronic device 1a, with differences therebetween as follows.

In some embodiments, the transmitting component 33 may operate at either a beamforming mode or a MIMO mode. The electronic component 40 may be configured to determine the operation mode of the transmitting component 33. In this embodiment, the geometry centers of the transmitting components 33 and 34 may define a distance d6 along the X direction. In some embodiments, the distance d6 may be substantially equal to 2 λ of a signal received and/or transmitted by the antenna array 304. In some embodiments, the transmitting component 33 may be aligned with the transmitting component 34 along the X direction. In some embodiments, the antenna arrays 304 of the transmitting components 33 and 34 may be aligned along the X direction.

Figure 4:
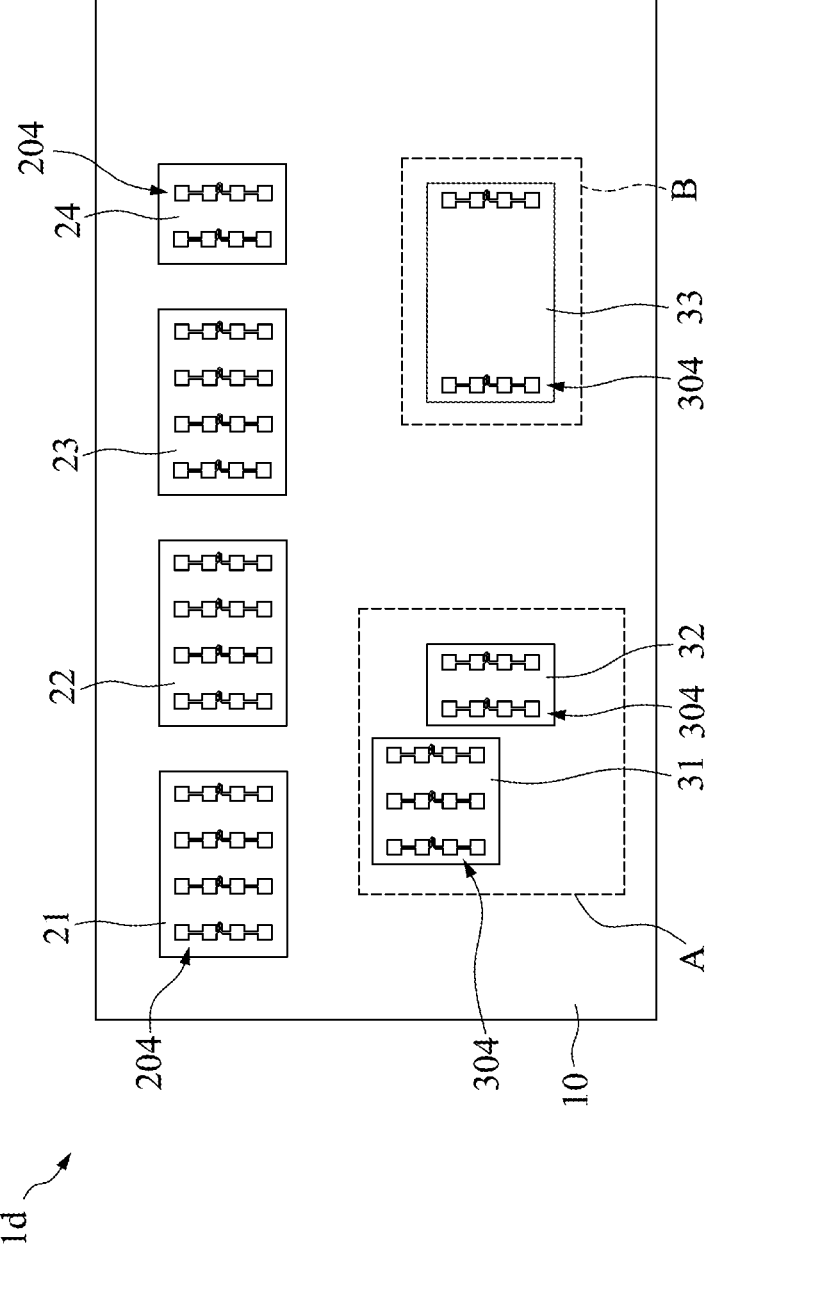
FIG. 4 is a cross-sectional view of an electronic device, in accordance with an embodiment of the present disclosure.

FIG. 4 is a cross-sectional view of an electronic device 1d, in accordance with an embodiment of the present disclosure. The electronic device 1d is similar to the electronic device 1a, with differences therebetween as follows.

In some embodiments, the quantity of the transmitting components and the receiving components may be different. For example, the electronic device 1d may have four receiving components (e.g., 21 to 24) and three transmitting components (e.g., 31 to 33). In some embodiments, the quantity of the antenna array 204 of the receiving component 24 may be different from that of the receiving component 21. In some embodiments, the surface area (e.g., the surface area of the upper surface or a projection area onto the circuit structure 10) of the receiving component 21 may be greater than that of the receiving component 24.

In some embodiments, the quantity of the antenna array 304 of the transmitting component 32 may be different from that of the transmitting component 31. In some embodiments, the quantity of the antenna arrays 304 of the transmitting component 33 may be different from that of the transmitting component 31. In some embodiments, the surface area (e.g., the surface area of the upper surface or a projection area onto the circuit structure 10) of the transmitting component 31 may be greater than that of the transmitting component 32. In some embodiments, the surface area (e.g., the surface area of the upper surface or a projection area onto the circuit structure 10) of the transmitting component 33 may be greater than that of the transmitting component 32. In some embodiments, the quantity of the antenna arrays 304 of the transmitting component 33 may be equal to that of the transmitting component 32.

Figure 5:
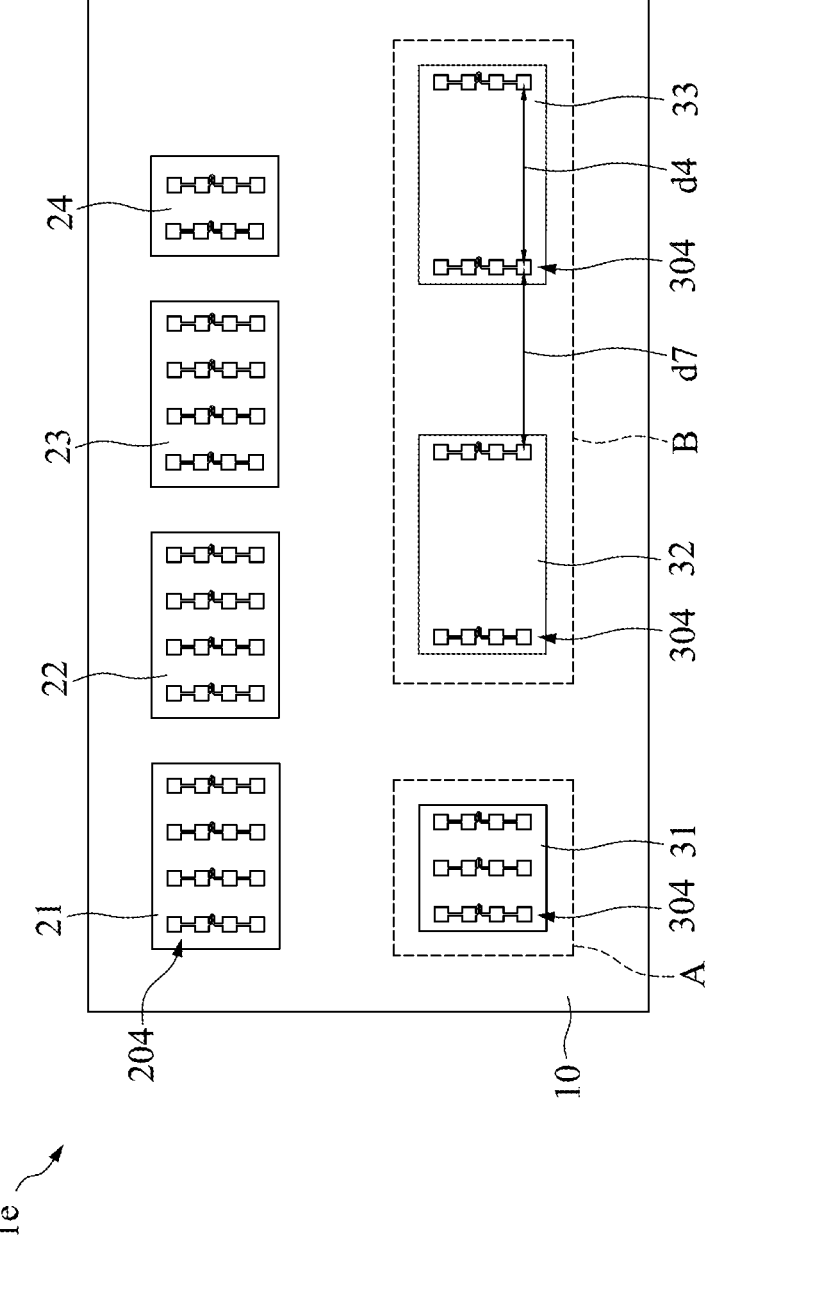
FIG. 5 is a cross-sectional view of an electronic device, in accordance with an embodiment of the present disclosure.

FIG. 5 is a cross-sectional view of an electronic device 1e, in accordance with an embodiment of the present disclosure. The electronic device 1e is similar to the electronic device 1a, with differences therebetween as follows.

In some embodiments, the transmitting component 31 may operate at the beamforming mode, and the transmitting component 32 and 33 may operate at the MIMO mode. In some embodiments, the antenna array 304 of different transmitting components (e.g., 32 and 33) may define a distance d7 along the X direction. In some embodiments, the distance d7 may be substantially equal to 2 λ of a signal received and/or transmitted by the antenna array 304.

Figure 6:
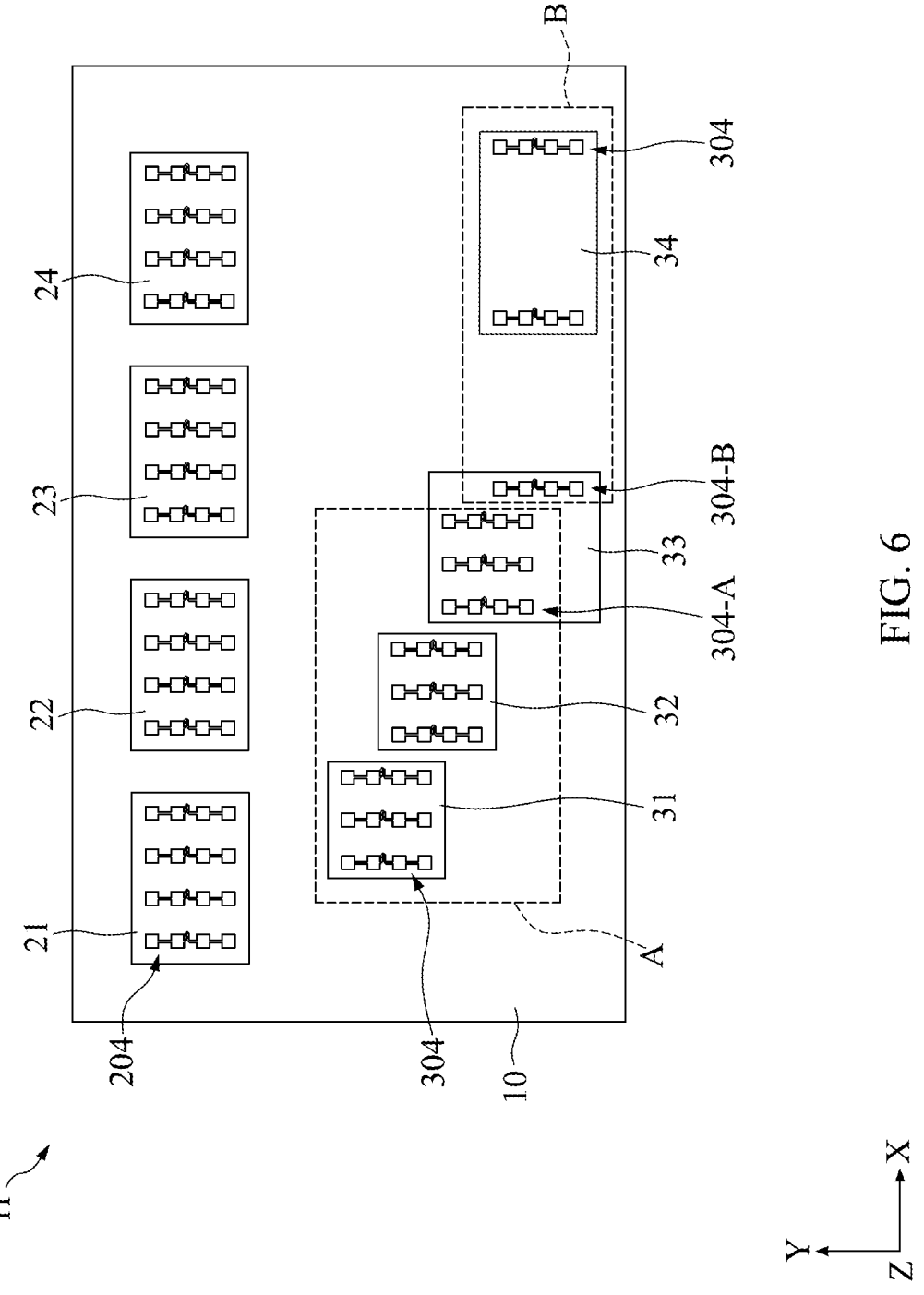
FIG. 6 is a cross-sectional view of an electronic device, in accordance with an embodiment of the present disclosure.

FIG. 6 is a cross-sectional view of an electronic device if, in accordance with an embodiment of the present disclosure. The electronic device if is similar to the electronic device 1a, with differences therebetween as follows.

In some embodiments, the transmitting component 33 may include antenna arrays 304-A and 304-B. The antenna arrays 304-A may be configured to operate at the beamforming mode with the transmitting components 31 and 32. The antenna array 304-B may be configured to operate at the MIMO mode with the transmitting component 34. In some embodiments, the antenna array 304-A and the antenna array 304-B may have a shift along the X direction.

Spatial descriptions, such as "above," "below," "up," "left," "right," "down," "top," "bottom," "vertical," "horizontal," "side," "higher," "lower," "upper," "over," "under," and so forth are indicated with respect to the orientation shown in the figures unless otherwise specified. It should be understood that the spatial descriptions used herein are for purposes of illustration only, and that practical implementations of the structures described herein can be spatially arranged in any orientation or manner, provided that the merits of embodiments of this disclosure are not deviated from by such an arrangement.

As used herein, the terms "approximately," "substantially," "substantial" and "about" are used to describe and account for small variations. When used in conjunction with an event or circumstance, the terms can refer to instances in which the event or circumstance occurs precisely as well as instances in which the event or circumstance occurs to a close approximation. For example, when used in conjunction with a numerical value, the terms can refer to a range of variation less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to 0.05%. For example, two numerical values can be deemed to be "substantially" the same or equal if a difference between the values is less than or equal to ±10% of an average of the values, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%.

Two surfaces can be deemed to be coplanar or substantially coplanar if a displacement between the two surfaces is no greater than 5 μm, no greater than 2 μm, no greater than 1 μm, or no greater than 0.5 μm.

As used herein, the singular terms "a," "an," and "the" may include plural referents unless the context clearly dictates otherwise.

As used herein, the terms "conductive," "electrically conductive" and "electrical conductivity" refer to an ability to transport an electric current. Electrically conductive materials typically indicate those materials that exhibit little or no opposition to the flow of an electric current. One measure of electrical conductivity is Siemens per meter (S/m). Typically, an electrically conductive material is one having conductivity greater than approximately 104 S/m, such as at least 105 S/m or at least 106 S/m. The electrical conductivity of a material can sometimes vary with temperature. Unless otherwise specified, the electrical conductivity of a material is measured at room temperature.

Additionally, amounts, ratios, and other numerical values are sometimes presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified.

While the present disclosure has been described and illustrated with reference to specific embodiments thereof, these descriptions and illustrations are not limiting. It should be understood by those skilled in the art that various changes may be made and equivalents may be substituted without departing from the true spirit and scope of the present disclosure as defined by the appended claims. The illustrations may not necessarily be drawn to scale. There may be distinctions between the artistic renditions in the present disclosure and the actual apparatus due to manufacturing processes and tolerances. There may be other embodiments of the present disclosure which are not specifically illustrated. The specification and drawings are to be regarded as illustrative rather than restrictive. Modifications may be made to adapt a particular situation, material, composition of matter, method, or process to the objective, spirit and scope of the present disclosure. All such modifications are intended to be within the scope of the claims appended hereto. While the methods disclosed herein have been described with reference to particular operations performed in a particular order, it will be understood that these operations may be combined, sub-divided, or re-ordered to form an equivalent method without departing from the teachings of the present disclosure. Accordingly, unless specifically indicated herein, the order and grouping of the operations are not limitations of the present disclosure.

What is claimed is:

1. An electronic device, comprising:
   a circuit structure;
   a plurality of receiving components disposed over the circuit structure and arranged along a first direction; and a plurality of transmitting components supported by the circuit structure, wherein the plurality of transmitting components comprises a first group of two or more transmitting components configured to operate at a beamforming mode and a second group of two or more transmitting components configured to operate at a multi-input multi-output (MIMO) mode, the second group of two or more transmitting components are substantially aligned along the first direction, and the first group of two or more transmitting components are substantially aligned along a second direction different from the first direction.

2. The electronic device of claim 1, further comprising:

an electromagnetic interference (EMI) shielding structure covering a lateral surface of at least one of the plurality of receiving components and configured to block EMI from the at least one of the plurality of receiving components to another one of the plurality of receiving components.

3. The electronic device of claim 1, wherein the plurality of receiving components are configured to receive electromagnetic waves reflected from an external object.

4. The electronic device of claim 1, wherein two abutting transmitting components of the first group of two or more transmitting components partially overlap along the first direction.

5. The electronic device of claim 1, wherein a quantity of receiving components is greater than a quantity of transmitting components.

*   *   *   *   *